(12) United States Patent
Hadap et al.

(10) Patent No.: US 8,675,993 B2
(45) Date of Patent: Mar. 18, 2014

(54) METHODS AND APPARATUS FOR PATCH-BASED SHAPE FROM SHADING

(75) Inventors: Sunil Hadap, San Jose, CA (US); Alexandros Panagopoulos, Astoria, NY (US)

(73) Assignee: Adobe Systems Incorporated, San Jose, CA (US)

( * ) Notice: Subject to any disclaimer, the term of this patent is extended or adjusted under 35 U.S.C. 154(b) by 223 days.

(21) Appl. No.: 13/046,637

(22) Filed: Mar. 11, 2011

(65) Prior Publication Data

US 2013/0127859 A1    May 23, 2013

Related U.S. Application Data

(60) Provisional application No. 61/380,172, filed on Sep. 3, 2010.

(51) Int. Cl.
*G06K 9/36*    (2006.01)

(52) U.S. Cl.
USPC .......................................... 382/285; 382/195

(58) Field of Classification Search
USPC ........... 345/420, 426; 356/625; 382/118, 154, 382/264, 274
See application file for complete search history.

(56) References Cited

U.S. PATENT DOCUMENTS

| 7,379,195 | B2 * | 5/2008 | Yoon et al. | 356/625 |
|---|---|---|---|---|
| 7,620,309 | B2 | 11/2009 | Georgiev | |
| 7,756,325 | B2 * | 7/2010 | Vetter et al. | 382/154 |
| 7,872,796 | B2 | 1/2011 | Georgiev | |
| 7,948,514 | B2 | 5/2011 | Sato et al. | |
| 7,949,252 | B1 | 5/2011 | Georgiev | |
| 7,956,924 | B2 | 6/2011 | Georgiev | |
| 7,962,033 | B2 | 6/2011 | Georgiev et al. | |
| 8,009,880 | B2 * | 8/2011 | Zhang et al. | 382/118 |
| 8,019,215 | B2 | 9/2011 | Georgiev et al. | |
| 8,094,964 | B2 * | 1/2012 | Hadap et al. | 382/274 |
| 8,155,456 | B2 | 4/2012 | Babacan et al. | |
| 8,189,065 | B2 | 5/2012 | Georgiev et al. | |
| 8,189,089 | B1 | 5/2012 | Georgiev et al. | |
| 8,228,417 | B1 | 7/2012 | Georgiev et al. | |
| 8,238,738 | B2 | 8/2012 | Georgiev | |

(Continued)

OTHER PUBLICATIONS

Zhang, R., et al., "Shape from shading: a survey", IEEE Trans. on Pattern Analysis and Machine Intelligence, vol. 21, No. 8, Aug. 1999.*

(Continued)

*Primary Examiner* — Vikkram Bali
*Assistant Examiner* — Xuemei Chen
(74) *Attorney, Agent, or Firm* — Wolfe-SBMC

(57) ABSTRACT

Methods and apparatus for patch-based construction of an object shape from the shading of an image are disclosed. An image is divided into a set of image subregions. For each image subregion, a set of subregion dictionary entries is identified. Each of the set of subregion dictionary entries includes a subregion entry appearance matching an appearance of the respective image subregion and a subregion entry geometry. A set of optimal subregion dictionary entries is identified. Identifying the set of optimal subregion dictionary entries includes minimizing an energy function of the sets of subregion dictionary entries for all image subregions. Each optimal subregion dictionary entry is, for a respective one of the image subregions, a subregion entry associated with a minimum of the energy function. The shape includes a shape construction parameter from a subregion geometry entry of each optimal subregion geometry entry of the set of optimal subregion geometry entries.

20 Claims, 14 Drawing Sheets

(56) References Cited

U.S. PATENT DOCUMENTS

| | | | |
|---|---|---|---|
| 8,244,058 B1 | 8/2012 | Intwala et al. | |
| 8,289,318 B1 * | 10/2012 | Hadap et al. | 345/420 |
| 8,290,358 B1 | 10/2012 | Georgiev | |
| 8,315,476 B1 | 11/2012 | Georgiev et al. | |
| 8,363,929 B2 | 1/2013 | Kojima et al. | |
| 8,625,931 B2 | 1/2014 | Hadap et al. | |
| 2010/0074551 A1 * | 3/2010 | Lin et al. | 382/264 |
| 2010/0085359 A1 * | 4/2010 | Wu et al. | 345/426 |
| 2013/0127860 A1 | 5/2013 | Hadap et al. | |

OTHER PUBLICATIONS

Huang, X., et al., "Examplar-based shape from shading", Six International Conference on 3-D Digital Imaging and Modeling (3DIM 2007), Aug. 2007.*

Cho, T. S., et al., "The patch transform and its applications to image editing," IEEE Conference on Computer Vision and Pattern Recognition, Jun. 23-28, 2008.*

Emmanuel Prados, Olivier Faugeras "Shape From Shading" published in Handbook of Mathematical Models in Computer Vision Springer (Ed.) (2006) pp. 375-388.

Jan J. Koenderink, Andrea J. van Doorn "Shape and Shading" The Visual Neurosciences, 2003 pp. 1-28.

V. S. Ramachandran "Perception of shape from shading" Nature. com, University of California,California,USA 1988 pp. 1-2.

U.S. Appl. No. 12/628,437, filed Dec. 1, 2009, Todor G. Georgiev.

U.S. Appl. No. 12/957,312, filed Nov. 30 2010, Todor G. Georgiev.

U.S. Appl. No. 12/957,322, filed Nov. 30, 2010, Todor G. Georgiev.

U.S. Appl. No. 12/957,320, filed Nov. 30, 2010, Todor G. Georgiev.

U.S. Appl. No. 12/957,316, filed Nov. 30, 2010, Todor G. Georgiev.

U.S. Appl. No. 12/790,677, filed May 28, 2010, Todor G. Georgiev.

"Non-Final Office Action", U.S. Appl No. 13/046,638, (Apr. 4, 2013), 11 pages.

"Notice of Allowance", U.S. Appl. No. 13/046,638, (Aug. 16, 2013),10 pages.

Castelan, et al., "Example-Based Face Shape Recovery Using the Zenith Angle of the Surface Normal", *Proceedings of the artificial intelligence 6th Mexican international conference on Advances in artificial intelligence*, (Nov. 2007), pp. 758-768.

"Supplemental Notice of Allowance", U.S. Appl. No. 13/046,638, (Sep. 18, 2013), 2 pages.

* cited by examiner

110
Input image

140
Output shape

METHODS AND APPARATUS FOR PATCH-BASED SHAPE FROM SHADING

CLAIM FOR PRIORITY TO PROVISIONAL APPLICATION

This application claims benefit of priority of U.S. Provisional Application Ser. No. 61/380,172 entitled "Systems and Methods for Shape from Shading" filed Sep. 3, 2010, the content of which is incorporated by reference herein in its entirety.

BACKGROUND

Description of the Related Art

Research in computerized graphics processing has long sought to extract data for modeling three-dimensional features of a feature portrayed in an image from two-dimensional images of the feature. Researchers have sought to express data for modeling three-dimensional features of an item in several ways: depth maps, surface normal vectors, surface gradients, and surface slant and tilt. Depth can be considered either as the relative distance from a camera to surface points or the relative surface height above the x-y plane. Surface normal vectors are the orientation of a vector perpendicular to a tangent plane on the object surface.

In computer vision, the techniques to recover shape are called shape-from-X techniques, where X can be shading, stereo, motion, texture, etc. Shape from shading (SFS) deals with the recovery of shape from a gradual variation of shading in the image.

A common model of image formation is the Lambertian model, in which the gray level at a pixel in the image depends on a light source direction and the surface normal vector. In SFS, given a gray level image, the aim is to recover the light source and the surface shape at each pixel in the image.

SUMMARY

Various embodiments of methods and apparatus for patch-based construction of an object shape from the shading of an image are disclosed. An image is divided into a set of image subregions. For each image subregion, a set of subregion dictionary entries is identified. Each of the set of subregion dictionary entries includes a subregion entry appearance matching an appearance of the respective image subregion and a subregion entry geometry. A set of optimal subregion dictionary entries is identified. Identifying the set of optimal subregion dictionary entries includes minimizing an energy function of the sets of subregion dictionary entries for all image subregions. Each optimal subregion dictionary entry is, for a respective one of the image subregions, a subregion entry associated with a minimum of the energy function. The shape includes a shape construction parameter from a subregion geometry entry of each optimal subregion geometry entry of the set of optimal subregion geometry entries.

Figure 1:
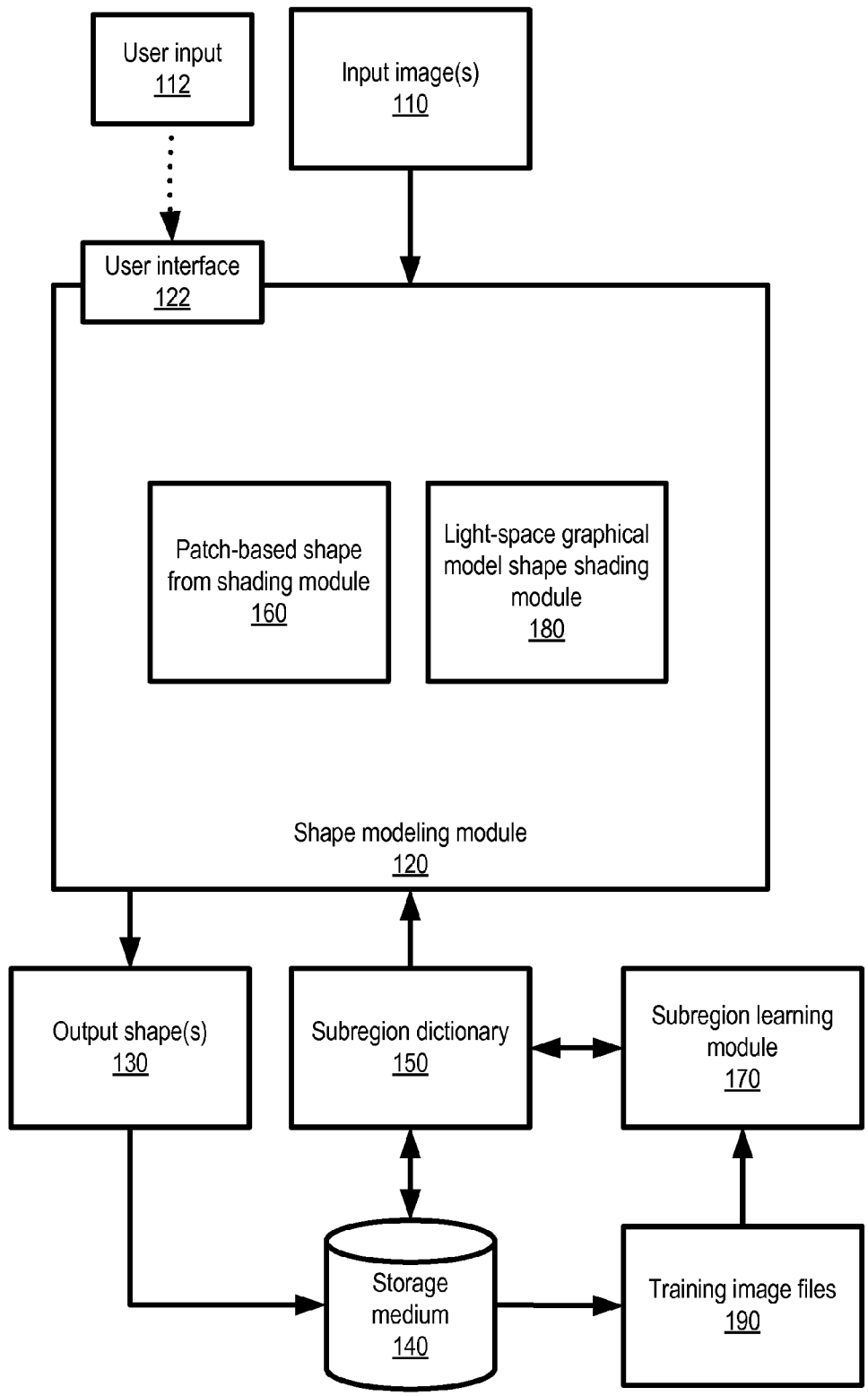
FIG. 1 depicts a module that may implement methods to derive shape from shading of images according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and methods for determining a shape of an object from its appearance, and more particularly, its shading, as it appears in an image are described. In one embodiment of a subregion-based method, an image is divided into a set of image subregions. For each image subregion, a set of subregion dictionary entries is identified. Each of the set of subregion dictionary entries includes a subregion entry appearance matching an appearance of the respective image subregion and a subregion entry geometry. A set of optimal subregion dictionary entries is identified. Identifying the set of optimal subregion dictionary entries includes minimizing an energy function of the sets of subregion dictionary entries for all image subregions. Each optimal subregion dictionary entry is, for a respective one of the image subregions, a subregion entry associated with a minimum of the energy function. Such optimal subregion entries are selected as on the basis of their usefulness, as a set, in reconstructing the entire image. The shape includes a shape construction parameter from a subregion geometry entry of each optimal subregion geometry entry of the set of optimal subregion geometry entries. The shape can be reconstructed using the subregion geometry entries of the optimal subregion dictionary entry for each image subregion. In some embodiments, shape reconstruction may employ the estimation of extra parameters in order to singularly determine the subregion shape from the optimal subregion geometry entry. These parameters may also be part of the model energy, and therefore determined by the minimization of that energy.

In one embodiment of a light-space graphical model based method, a set of normal vectors or other shape construction parameters corresponding to a set of pixels in an image is defined. The defining the set of normal vectors includes defining each normal vector in terms of the spherical coordinates (zenith and azimuth) in the coordinate system of the light source, such that the orientation of the light source corresponds to a zenith value of 0. The zenith of each normal vector is constrained based on an observed shading of a respective pixel. A shape is constructed from the image. Constructing the shape includes minimizing an energy function to specify an azimuth value and a zenith value of each normal vector. The minimizing the energy function further includes constraining the azimuth of each normal vector based on an image gradient of the image at each respective pixel. The constraining the azimuth enforces a coplanar assumption between the image gradient expressed in a three-dimensional space and the respective normal vector. In some embodiments, light-space and subregion based methods may be used serially to refine an estimate of a shape from a single image.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to Patch-Based Data-Driven Shape from Shading

A system and method are provided to retrieve the shape of an object from its appearance, and more particularly, appearance variations due to the interaction of illumination and the object's shape, as the object appears in a single image. Image patches, alternatively called subregions herein, serve as a source of information for the purpose of extracting a shape from shading. The method may include retrieving the orientation of three-dimensional surfaces using learned patch dictionaries. In some embodiments, the term dictionary refers to a collection of patches. Each patch may consist of the corresponding appearance and geometry. The dictionary may further include collected statistics and other information on properties of the patches stored in the dictionary, or encountered during the training phase. The term image patch, or subregion, refers to a sample of an image consisting of more than one pixel of the image. The terms subregion and patch, as used herein, are interchangeable, and some methods are interchangeably described as being patch-based or subregion-based. In some embodiments, subregions are rectangular, and are composed of only a few pixels. The method may include a training phase and a testing phase. An embodiment of training operations is discussed below with respect to FIG. 7B. During training, a patch or subregion dictionary is constructed from a set of training images. In the testing phase, the methods discussed below, particularly with respect to FIGS. 7A, 8 and 9, may construct a surface geometry that explains a given test image. In some embodiments, such a surface geometry is provided as a map of normal vectors of the surface.

In the training phase described below with respect to FIG. 7B, a set of training images and corresponding known normal maps are used as input. An example set of training images and normal maps is described below with respect to FIG. 3. Each training image and the corresponding normal map are divided into (possibly overlapping) patches or subregions of a given size (e.g., m×n or m×m). Training images are accompanied by known geometry (in some embodiments, in the form a normal map), and are only used for the construction of the dictionary and to extract relevant statistics about patches (that may also be stored in the dictionary). Test images, by contrast, involve only appearance, and embodiments determine the geometry, such that, as used herein, a test image is any image we will apply our algorithm on after training is performed. Each patch or subregion is added to a subregion dictionary ($\Omega$) if the subregion differs substantially from the patches or subregions already stored in the subregion dictionary. Metrics and thresholds for determining whether the subregion differs substantially from the patches or subregions already stored in the subregion dictionary will vary between embodiments. One of skill in the art will readily comprehend, in light of having read the present disclosure, that parameters such as thresholds for determining whether the subregion differs substantially from the patches or subregions already stored in the subregion dictionary or subregion geometry will vary between embodiments in order to control or optimize various aspects of performance/of the methods disclosed herein.

In some embodiments, a dictionary entry includes a subregion appearance and a subregion geometry. The subregion appearance may be a simple image, the similarity of which to a selected subregion of an image from which a shape is being constructed may be ascertained using conventional techniques that will be well-known to one of skill in the art in light of having read the present disclosure. In some embodiments, the subregion geometry may be decomposed in components, in order to make the dictionary more compact and remove ambiguities. In some embodiments, the geometry of each subregion dictionary entry in the subregion dictionary may be defined up to some parameters (e.g., an azimuth angle). Such an azimuth angle, for example, may be determined when reconstructing a surface represented by the subregion.

In the testing phase, a new input image with unknown underlying geometry is provided. The method reconstructs the underlying geometry as a normal map, using the dictionary learned during the training phase. First, the test image is divided into a set of overlapping patches. For each image patch, the method finds a set of the k entries in the dictionary with the most similar appearance to the observed patch appearance. To define the normal map which underlies the given image, the method may select one of the k dictionary matches for each image patch, and the parameters (e.g., azimuth angle) that disambiguate the geometry of that patch. This may be treated as a labeling problem on a graphical model.

In some embodiments, a graphical model for patch-based shape from shading contains one node for each subregion in the input image. A label of each node corresponds to a selection of one of k subregion dictionary matches and the accompanying parameters that best explain this subregion. An energy $E(x)$ is defined for each label assignment x on this model. The x that minimizes this energy is the most probable set of patch and parameter choices, given the input image. In such an embodiment, the model energy has the following general form:

$$E(x) = \sum_i \varphi_i(x_i^A) + \sum_i \psi_i(x_i^\theta) + \sum_{i,j} \xi_{i,j}(x_i^{G,\theta}, x_j^{G,\theta}) + \sum_{i,j} \zeta_{i,j}(x_i^{G,\theta}, x_j^{G,\theta}).$$

The first term $\varphi_i$ corresponds to the difference between the appearance $x_i^A$ of selected match $x_i$ and the observed appearance of patch i. The first term $\varphi_i$ penalizes dictionary matches that correspond to appearances considerably different from the observed appearance. This difference can be calculated as: $\varphi_i(x_i^A = w_1 \|x_i^A - I_i\|$, where $I_i$ is the appearance of patch i in the input image and $w_1$ is a weight.

The second term $\psi_i(x_i^\theta)$ corresponds to the prior probability of parameter choices $x_i^\theta$ given the learned dictionary, penalizing parameter choices that are far from the observed values of these parameters while training. This term can be calculated as: $\psi_i(x_i^\theta = -w_2 (P(x_i^\theta|\mathcal{D}))$, where $w_2$ is a weight and $P(x_i^\theta|\mathcal{D})$ is the probability of the parameter values indicated by $x_i^\theta$, based on the values observed while training dictionary $\mathcal{D}$. The probability $P(x_i^\theta|\mathcal{D})$ is calculated, in some embodiments, by fitting a Gaussian mixture model to the set of observed values for each parameter of interest.

The third term $\xi_{i,j}(x_i^{G,\theta}, x_j^{G,\theta})$ enforces compatibility between matches $x_i$ and $x_j$ for overlapping patches i and j, by penalizing disagreements between the geometry component of the two matches in the region of overlap between i and j. This term can be calculated by the sum of square difference between normals of the two patches that coincide in the image:

$$\xi_{i,j}(x_i^{G,\theta}, x_j^{G,\theta}) = w_3 \sum_{s,t} \left(n_i^{G,\theta}(s) - n_j^{G,\theta}(t)\right)^2,$$

where a pixel s of patch i corresponds to the same image pixel as pixel t of patch j, and $n_k^{G,\theta}(u)$ is the normal vector at pixel u of patch k indicated by label $x_k^{G,\theta}(u)$, which is reconstructed by the information stored in the dictionary for patch k and by the mean azimuth angle $x_k^\theta$ (which is included in label $x_k^{G,\theta}(u)$). $w_3$ is a weight.

A fourth term $\zeta_{i,j}(x_i^{G,\theta}, x_j^{G,\theta})$ penalizes violations of surface integrability in the region of overlap between patches i and j. Enforcing integrability for the estimated normal map ensures that the normal map corresponds to a plausible 3D surface. In order to compute term $\zeta_{i,j}(x_i^{G,\theta}, x_j^{G,\theta})$, embodiments first compute the normal map $n_{i,j}$ resulting from the combination of patches indicated by $x_i^{G,\theta}$ and $x_j^{G,\theta}$ in the area of overlap of those two patches. The normal map $N_{i,j}$ can be computed as a weighted average of the two patches for each pixel where they overlap. Embodiments then compute the vector field $G_{i,j}$ that is equivalent to normal map $N_{i,j}$ for the applicable region. Vector Field $G=\{(g_x, g_y)\}$ is associated with the equivalent normal map $N=\{n\}$ by $$g_x = \frac{\partial n_z}{\partial n_x}, g_y = \frac{\partial n_z}{\partial n_y}.$$

Having defined $G_{i,j}$, we can define $\zeta_{i,j}(x_i^{G,\theta}, x_j^{G,\theta})$, as:

$$\zeta_{ij}(x_i^{G,\theta}, x_j^{G,\theta}) = w_4 \sum_{(x,y)\in\Xi} (g_x(x, y) - g_x(x, y+1) - g_y(x, y) + g_y(x+1, y),),$$

where $w_4$ is a weight. One or more of these terms may be optional in some embodiments.

Minimizing the above energy function yields, in some embodiments, a highly-probable geometry for the input image, given the dictionary $\Omega$. In some embodiments, overlapping patches are used. Because such embodiments generate a geometry by combining overlapping patches, disagreements may result in loss of fine detail and "seams." In such embodiments, a final stage employing an alternative shape from shading model or other image reconstruction model can improve local detail to result in an accurate surface reconstruction. The final stage may be a refinement stage, where the reconstructed normal vectors are smoothed across the seams or may be another shape from shading algorithm, which will use the reconstructed surface from the present method as extra information or prior information.

Light-Space Graphical Model for Shape from Shading

Some embodiments may retrieve the shape of an object from its appearance, and more particularly, its shading, as it appears in a single image. In some embodiments, the shape may be retrieved in terms of per-pixel normal vectors or other shape construction parameters. Embodiments may employ an energy minimization approach, based on a graphical model. Each normal vector n may be defined by its spherical coordinates $(\phi,\theta)$ in the coordinate system of the light source (assuming a single light source). If it is assumed that the object exhibits Lambertian reflectance, a shape may be constructed based on an assumption that the observed image intensities only depend on the zenith angle $\phi$. Such an assumption is based on the definition of Lambertian reflectance, implying that the zenith angle $\phi$ for each normal vector may be strongly and directly constrained based on the observed shading, while having a different set of constraints for the azimuth angles $\theta$.

In particular, azimuth angles may be constrained based on the gradients of the observed image, by assuming that the normal vector and the two-dimensional image gradient expressed in three-dimensional space exhibit co-planar behavior. Furthermore, different smoothness constraints may be used for zenith and azimuth angles, to take into account that different reliability of the information for each of them.

Therefore, the normal at each pixel is defined by two scalar values, $\phi$ and $\theta$. The most probable set of values to reconstruct the geometry underlying an input image may be inferred by formulating the problem as a graphical model. The graphical model contains two nodes for each pixel, one node for $\phi$ and one node for $\theta$. The energy of this model may be defined, given an assignment of labels $x=\{\phi_i,\theta_i\}$, by a set of potential functions as:

$$E(x) = \sum_i \chi(\phi_i) + \sum_i \zeta_i(\theta_i) + \sum_{i,j} \psi_{i,j}(\phi_i, \phi_j) + \sum_{i,j} \xi_{i,j}(\theta_i, \theta_j).$$

The first term $\chi_i(\phi_i)$ is a potential function which penalizes values of the zenith angle $\theta_i$ that correspond to shading at pixel i that is far from the observed image intensity $I_i$ at pixel i. In embodiments where lambertian reflectance is assumed, this term may have the form:

$\chi_i(\phi_i) = w_\chi (\max\{\cos(\phi_i),0\} - I_i)^2$, where $w_\chi$ is a weight.

The second term $\zeta_i$ expresses the dependency of the azimuth value at pixel i to the observed image gradient at pixel i. Let $g_i$ be the image gradient at pixel i. The projection of the normal vector at pixel i onto the image plane will be a 2D vector depending on the azimuth angle, $n_2(\theta_i)$. Then the term $\zeta_i$ takes the form: $\zeta_i = w_\zeta \|g_i - n_2(\theta_i)\|$, where $w_\zeta$ is a weight.

The third term $\psi_{i,j}$ corresponds to a smoothness assumption for the zeniths of neighboring pixels i and j. Then the term $\psi_{i,j}$ may take the form: $\psi_{i,j}(\phi_i,\phi_j) = w_\phi (\langle\phi_i - \phi_j\rangle)^2$, where $w_\phi$ is a weight and the difference $\langle \phi_i - \phi_j \rangle$ may be calculated taking into account that $\phi_i$ and $\phi_j$ are angles in the $[-\pi,\pi]$ domain. The fourth term, $\xi_{i,j}$, corresponds to a smoothness assumption for the azimuths of neighboring pixels i and j, and may take a form similar to term $\psi_{i,j}$: $\xi_{i,j}(\theta_i,\theta_j) = w_\theta (\langle \theta_i - \theta_j \rangle)^2$, where $w_\theta$ is a weight.

The two smoothness terms $\psi_{i,j}$ and $\xi_{i,j}$ are, in some embodiments, modified to use weights $w_\phi, w_\theta$ that vary by taking into account the local image gradient. In some embodiments, another set of terms $\chi_{i,j,k}$, can be added to express integrability constraints, penalizing calculated normals that deviated from a valid three-dimensional surface by enforcing a zero-curl assumption. Such embodiments let i be a pixel with image coordinates (x,y). Potential $u_{i,j,k}$ is defined so that pixel j will have image coordinates (x,y+1) and pixel k image coordinates (x+1,y). Given the spherical coordinates $\phi,\theta$ of the normal vectors at pixels i, j and k, embodiments can compute the Cartesian coordinates of these normal vectors $n_i$, $n_j$, $n_k$. Let g be the vector field corresponding to the normal map N={n} defined by some set of labels x. Vector field G={($g_x$, $g_y$)} is associated with the equivalent normal map N by $$g_x = \frac{\partial n_z}{\partial n_x}, g_y = \frac{\partial n_z}{\partial n_y}.$$

Given the zenith and azimuth angles at pixels i, j and k, embodiments can define the integrability constraint term $u_{i,j,k}$ as:

$$u_{i,j,k}(\phi_i, \theta_i, \phi_j, \theta_j, \phi_k, \theta_k) = w_u \sum_{(x,y)\in\Xi} (g_x(i) - g_x(j) - g_y(i) + g_y(k),)$$

where $w_u$ is a weight and $g_x(t),g_y(t)$ are the x- and y-components of the gradient field G as described above. One or more of the above-described terms may be optional in some embodiments.

Some embodiments are built to select values of normal vectors based on the inference that the most probable labels for the above graphical model correspond to minimizing the energy E, and inference may be performed by a variety of different inference algorithms, such as graph-cut or message-passing algorithms. Performing inference on a graphical model such as the one described above includes finding an approximation to the most probable labels, corresponding to the (approximately) most probable assignment of values to the random variables that characterize the problem. Inference on this model corresponds to finding a (local) minimum of the energy E. Finding such a minimum yields the set of normal vectors that approximate the most probable normal map to explain the test image, given the described model.

In various embodiments employing the above approach, the zenith and azimuth are treated separately, with different smoothness constraints and different priors expressed by the corresponding potential functions. Furthermore, the potential functions may take any form, allowing flexibility in the modeling of the problem and providing the ability to assume specific probability distributions underlying each constraint.

Example Shape from Shading Module, Data Structures, and Images

Various embodiments of methods and apparatus for determining a shape of an object from its appearance, and more particularly, its shading, as it appears in an image are implemented through a shape modeling module, as described below. Some embodiments may include a means for accessing a two-dimensional input image and providing as output a three-dimensional vector field representing a shape associated with the image. For example, some embodiments may implement a patch-based shape from shading method for generating a three-dimensional vector field representing a shape associated with a two-dimensional image. Some embodiments may implement a light-space-based shape from shading method for generating a three-dimensional vector field representing a shape associated with a two-dimensional image. Some embodiments may include both light-spaced and patch-based methods for retrieving three dimensional shape from a two-dimensional image, and some embodiments may use one to refine results presented by the other.

The shape from shading modules implementing embodiments described herein may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input identifying a digital image or a portion of a digital image on which shape from shading methods are to be performed, and loading such a digital image and storing a shape reconstruction data structure as described herein. Other embodiments of the shape from shading methods and module may be at least partially implemented by hardware circuitry and/or firmware stored, for example, in a non-volatile memory or other non-transitory storage medium.

FIG. 1 illustrates a shape modeling module that may implement one or more of the shape from shading image editing techniques and tools illustrated in FIGS. 2 through 9. Shape modeling module 120 may, for example, implement one or more of a light-space model shape from shading tool and a subregion-based shape from shading tool. FIG. 10 illustrates an example computer system on which embodiments of shape modeling module 120 may be implemented. Shape modeling module 120 receives as input one or more digital input images 110. An example image is shown in FIG. 4A. Shape modeling module 120 may receive user input 112 activating one or more of a light-space model shape from shading tool and a patch-based shape from shading tool. Shape modeling module 120 then constructs three-dimensional shape from the input image(s) 110, according to, in some embodiments, preferences expressed in user input 112 received via user interface 122, using the activated light-space model shape from shading tool or the patch-based shape from shading tool. The user may activate a different one of light-space model shape from shading tool or the patch-based shape from shading tool and further refine the shape, and/or may activate other tools and further refine the shape. Shape modeling module 120 generates as output one or more modified output shapes 130. Output shape(s) 130 may, for example, be stored to a storage medium 140, such as system memory, a disk drive, DVD, CD, etc.

In some embodiments, shape modeling module 120 may provide user interface 122 via which a user may interact with the shape modeling module 120, for example to activate one or more of a light-space model shape from shading tool and a patch-based shape from shading tool, to select input image 110, and to select parameters for performing a shape construction method as described herein. In some embodiments, the user interface may provide user interface elements whereby the user may select options including, but not limited to, dictionary selection constraints (e.g., the size of k or thresholds for inclusion into a set of possible subregion matches), degree of overlap in patch selection, known borders of an object for shape measurement, sensitivity of particular constraint operations, sequence of iteration of subregion based and light-space based refinements of a shape model, and/or options to balance image accuracy against processing requirements. In some embodiments, the user interface may provide user interface elements whereby the user may specify boundaries of shapes or edges or other discontinuities of shapes, or whether the tool is to use an entire image or a subset of an image. In some embodiments, the user interface may provide user interface elements whereby the user may specify which layers data is to be sampled from.

In some embodiments, a patch-based shape from shading module 160 performs a patch-based shape from shading method as described above and further described below with respect to FIGS. 2, 3, 5C, and 7A-9. In such a patch-based shape from shading method, input image 110 is divided into a set of image subregions, as discussed below with respect to FIG. 5C. For each image subregion, a set of subregion dictionary entries is identified as a possible match for the subregion from a subregion dictionary 150, which is described below with respect to FIG. 2. Each of the set of subregion dictionary entries includes a subregion entry appearance matching an appearance of the respective image subregion and a subregion entry geometry. The matching may be calculated using conventional image comparison techniques. A set of optimal subregion dictionary entries is identified for respective ones of the image subregions. The image subregions may overlap. Identifying the set of optimal subregion dictionary entries includes minimizing an energy function, as described above, of the sets of subregion dictionary entries for all image subregions. Each optimal subregion dictionary entry is, for a respective one of the image subregions, a subregion entry associated with a minimum of the energy function. Output shape 130 includes a shape construction parameter, such as a normal vector, from a subregion geometry entry of each optimal subregion geometry entry of the set of optimal subregion geometry entries.

In some embodiments, patch-based shape from shading module 160 uses and updates a subregion dictionary 150 generated by a subregion learning module 170. Subregion learning module 170 is configured to generate subregion dictionary 150 from training image files 190 and their corresponding normal maps by dividing a training image and a corresponding normal map into training subregions, comparing an appearance of a test subregion to entries of the subregion dictionary, and, in response to failure to find an entry of the subregion dictionary with an appearance matching an appearance of the test subregion, creating a new entry of the subregion dictionary comprising the appearance of the test subregion and a shape construction parameter of the test subregion. Statistics tracking the likelihood of appearance of a particular subregion dictionary entry and/or associated parameters are tracked and updated during both the training phase in which subregion dictionary 150 is generated. Such statistics are, in some embodiments, used for calculating a probability based on prior choices from a subregion dictionary of a selected subregion dictionary entry being an optimal subregion dictionary entry In some embodiments, a light-space graphical model shape from shading module 180 performs a light-space graphical model shape from shading method as described above and further described below with respect to FIGS. 5B and 6A-6C. A set of normal vectors corresponding to a set of pixels in input image 110 is defined. Each normal vector is defined in terms of the spherical coordinates (zenith and azimuth) in the coordinate system of the light source, such that the orientation of the light source corresponds to a zenith value of 0. The zenith of each normal vector is constrained based on an observed shading of a respective pixel of input image 110. An output shape 130 is constructed from input image 110. Constructing output shape 130 includes minimizing an energy function to specify an azimuth value and a zenith value of each normal vector in output shape 130. The minimizing energy function may further include constraining the azimuth of each normal vector in output shape 130 based on an image gradient of input image 110 at each respective pixel. The constraining the azimuth enforces a coplanar assumption between the image gradient in input image 110 expressed in a three-dimensional space and the respective normal vector in output shape 130.

Figure 2:
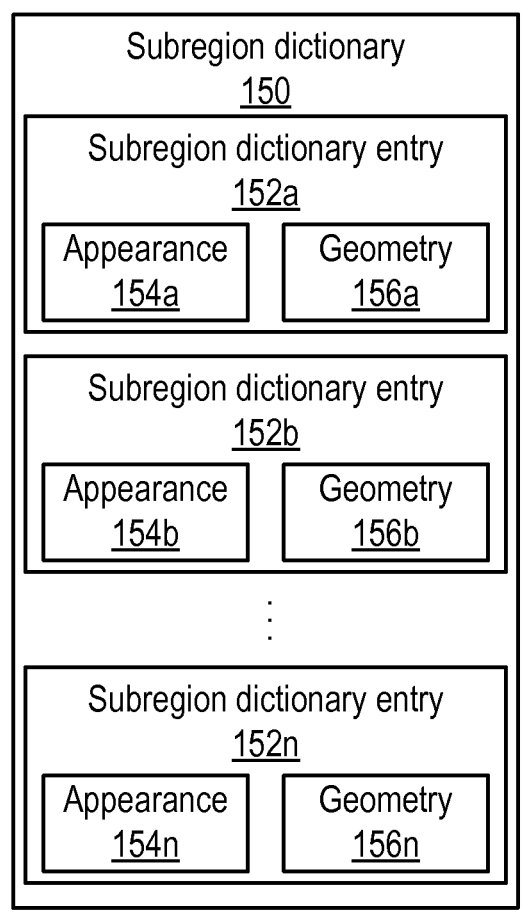
FIG. 2 illustrates a subregion dictionary that may be used to implement patch-based methods to derive shape from shading of images according to some embodiments.

FIG. 2 illustrates a subregion dictionary that may be used to implement patch-based methods to derive shape from shading of images according to some embodiments. Subregion dictionary 150 contains a set of subregion dictionary entries 152*a*-152*n*. In one embodiment, each of subregion dictionary entries 152*a*-152*n* includes a subregion entry appearance 154*a*-154*n* for matching an appearance of the respective image subregion, and a subregion dictionary entry geometry 156*a*-156*n* comprising a shape construction parameter for constructing an output shape from an image. The subregion appearances 154*a*-154*n* may be simple images, the similarity of which to a selected subregion of an image from which a shape is being constructed may be ascertained using conventional techniques that will be well-known to one of skill in the art in light of having read the present disclosure. In some embodiments, the subregion dictionary entry geometries 156*a*-156*n* may be decomposed in components, in order to make the dictionary more compact and remove ambiguities. In some embodiments, the geometry 156*a*-156*n* of each subregion dictionary entry 152*a*-152*n* in subregion dictionary 150 may be defined up to some parameters (e.g., an azimuth angle). Such an azimuth angle, for example, may be determined when reconstructing a surface represented by a subregion.

Figure 3:
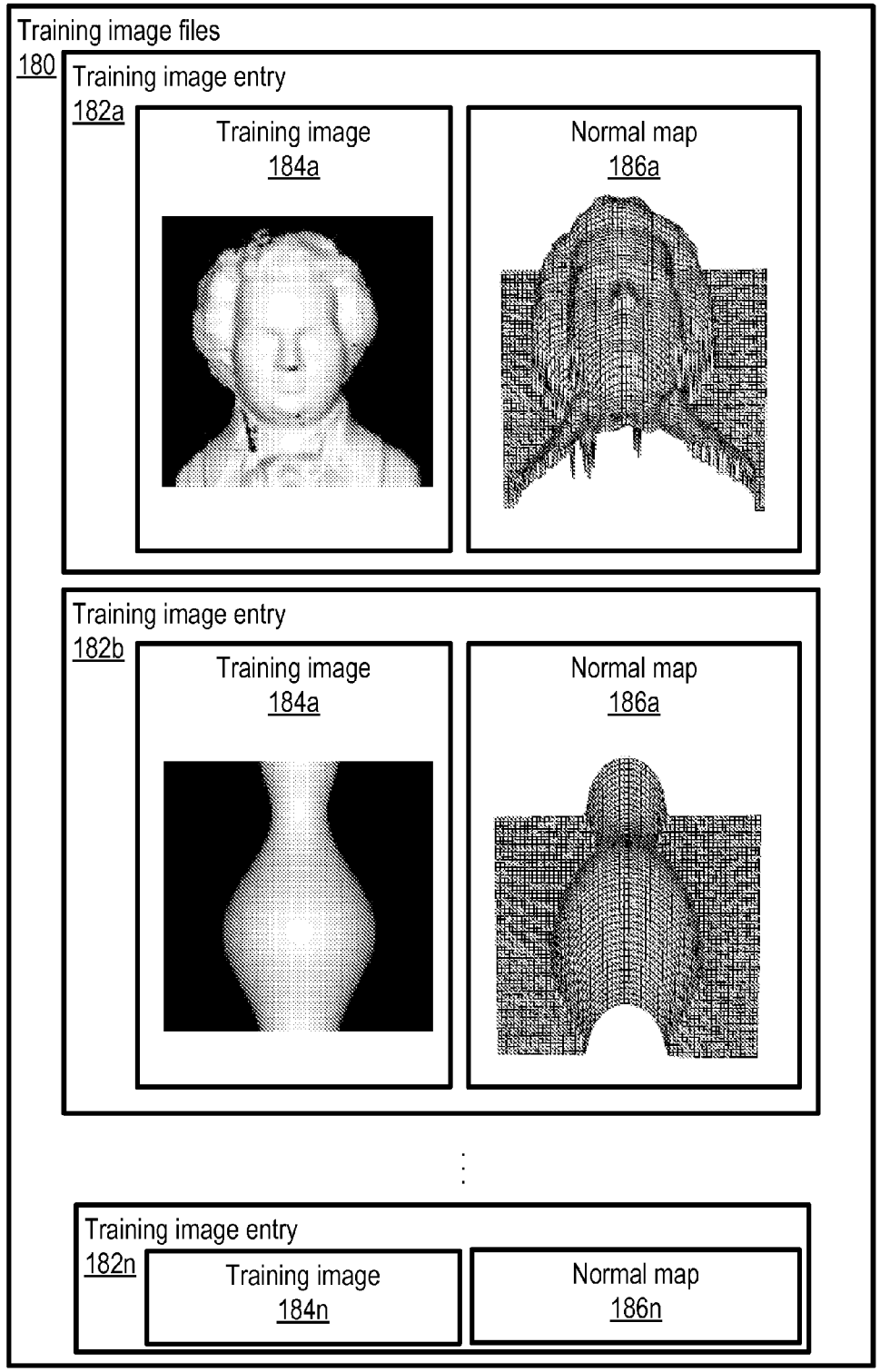
FIG. 3 depicts a set of test image files for developing a subregion dictionary that may be used to implement machine learning techniques in the context of patch-based methods to derive shape from shading of images according to some embodiments.

FIG. 3 depicts a set of test image files for developing a subregion dictionary that may be used to implement machine learning techniques in the context of patch-based methods to derive shape from shading of images according to some embodiments. Each of training image entries 182*a*-182*n* contains a test image 184*a*-184*n* and a normal map 186*a*-186*n*. In the training phase described below with respect to FIG. 7B, the set of training image entries 184*a*-184*n* and corresponding known normal maps 186*a*-186*n* are used as input. Each of the set of training image entries 184*a*-184*n* and the corresponding one of normal maps 186*a*-186*n* is divided into (possibly overlapping) patches or subregions of a given size (e.g., m×n or m×m). Each patch or subregion is added to a subregion dictionary, such as subregion dictionary 150, if the subregion differs substantially from the patches or subregions already stored in subregion dictionary 150. Metrics and thresholds for determining whether the subregion differs substantially from the patches or subregions already stored in subregion dictionary 150 will vary between embodiments without departing from the scope of the present disclosure.

Figure 4A:
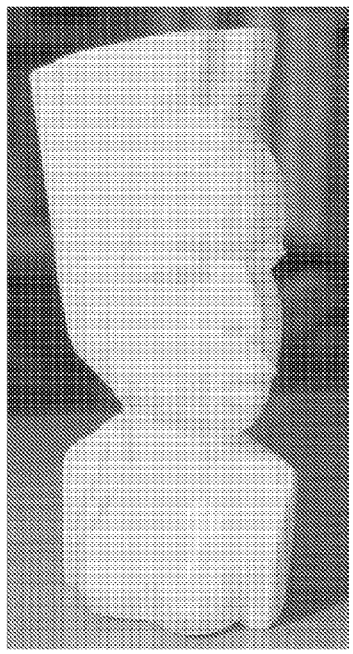
FIG. 4A illustrates a sample image on which methods to derive shape from shading of images according to some embodiments may be used.

FIG. 4A illustrates a sample image on which methods to derive shape from shading of images according to some embodiments may be used. An input image 110 provides the input data from which a shape from shading method can be used to generate an output shape 140. Input image 110 is composed of pixels (not individually segmented in figure). In some embodiments, a light-space graphical model is used to derive a surface normal vector from each pixel, as described above with respect to light-space graphical model shape-from shading module 180 and further described below with respect to figures FIGS. 5B and 6A-6C. In some embodiments, a patch-based shape from shading method is used to derive a surface normal vector from groups of pixels as described above with respect to patch-based shape from shading module 160 and further described below with respect to FIGS. 2, 3, 5C, and 7A-9. In some embodiments, both light-space and patch-based methods may be used to generate and refine output shape 140.

Figure 4B:
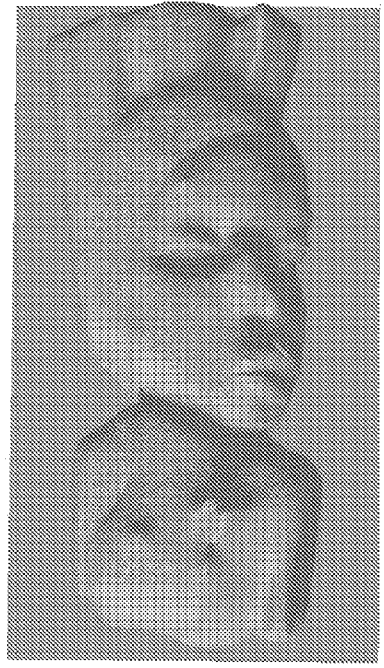
FIG. 4B depicts a depth field that may result from use of methods to derive shape from shading of images according to some embodiments.

FIG. 4B depicts a depth field that may result from use of methods to derive shape from shading of images according to some embodiments. Output shape 130 is composed of a set of surface normal vectors (not individually segmented in figure) derived from input image 110. In some embodiments, a light-space graphical model is used to derive the surface normal vectors from pixels of an input image, as described above with respect to light-space graphical model shape-from shading module 180 and further described below with respect to figures FIGS. 5B and 6A-6C. In some embodiments, a patch-based shape from shading method is used to derive the surface normal vectors from groups of pixels as described above with respect to patch-based shape from shading module 160 and further described below with respect to FIGS. 2, 3, 5C, and 7A-9.

Figure 5A:
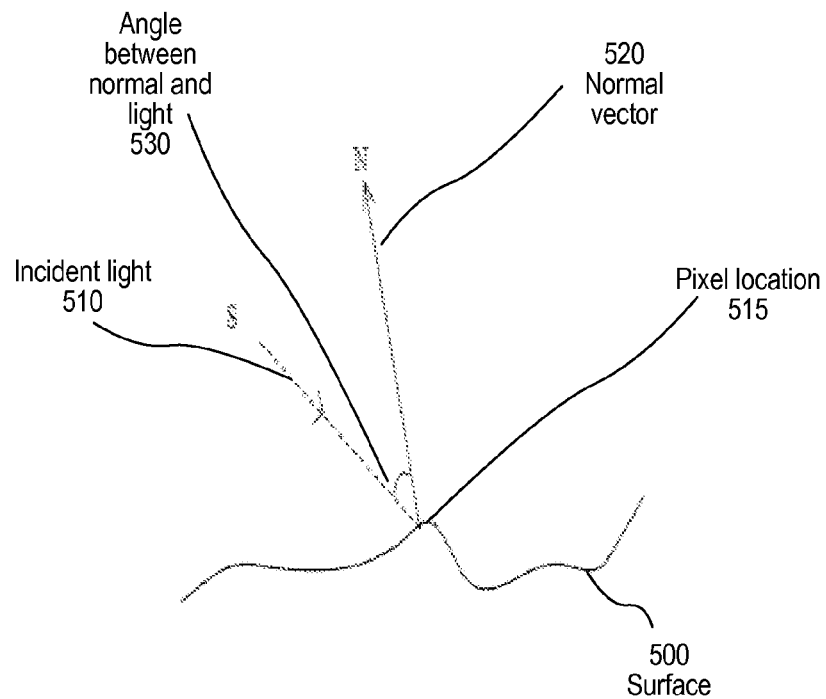
FIG. 5A illustrates light striking a surface and the estimation of a surface normal vector at a single pixel location according to some embodiments.

FIG. 5A illustrates light striking a surface and the estimation of a surface normal vector at a single pixel location according to some embodiments. Incident light 510 strikes a surface 500 at a pixel location 515. A normal vector 520 at the pixel location 515 is a vector perpendicular to surface 500 at pixel location 515. Embodiments of the invention attempt to identify normal vector 520 based on the assumption that surface 500 exhibits Lambertian (i.e., exclusively diffuse) reflectance, such that the brightness of the surface at pixel location 500 depends on the orientation of the surface at pixel location 515 to the incident light 510 from a light source.

Figure 5B:
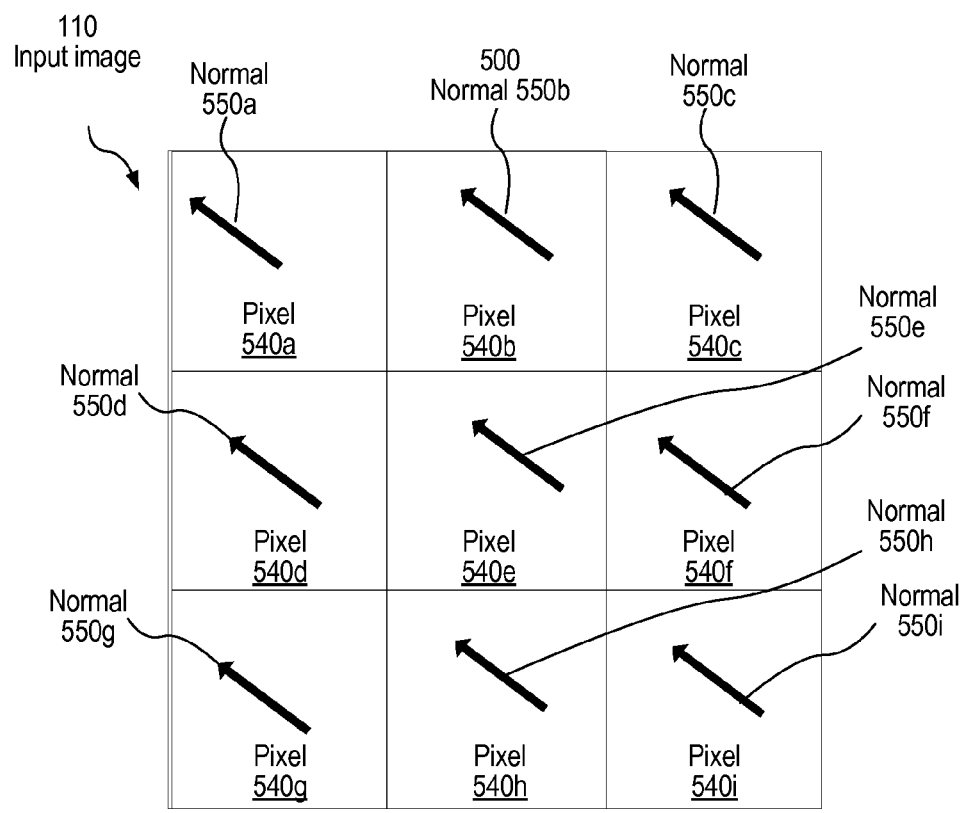
FIG. 5B depicts surface normal vectors at multiple pixel locations according to some embodiments.

FIG. 5B depicts surface normal vectors at multiple pixel locations according to some embodiments. In a given region of input image 110, each of pixels 540*a*-540*i* has a respective one of normal vectors 550*a*-550*i*. Embodiments of the invention attempt to identify normal vectors 550*a*-550*i* based on the assumption that surface 500 exhibits Lambertian (i.e., exclusively diffuse) reflectance. Some embodiments may retrieve the shape of an object (e.g., normal vectors 550*a*-550*i*) from its appearance, and more particularly, its shading (e.g., brightness of pixels 540*a*-540*i*), as it appears in a single image. In some embodiments, the shape may be retrieved in terms of per-pixel normal vectors (e.g., normal vectors 550*a*-550*i*), as described above with respect to light-space graphical model shape-from shading module 180 and further described below with respect to FIGS. 6A-6C.

Figure 5C:
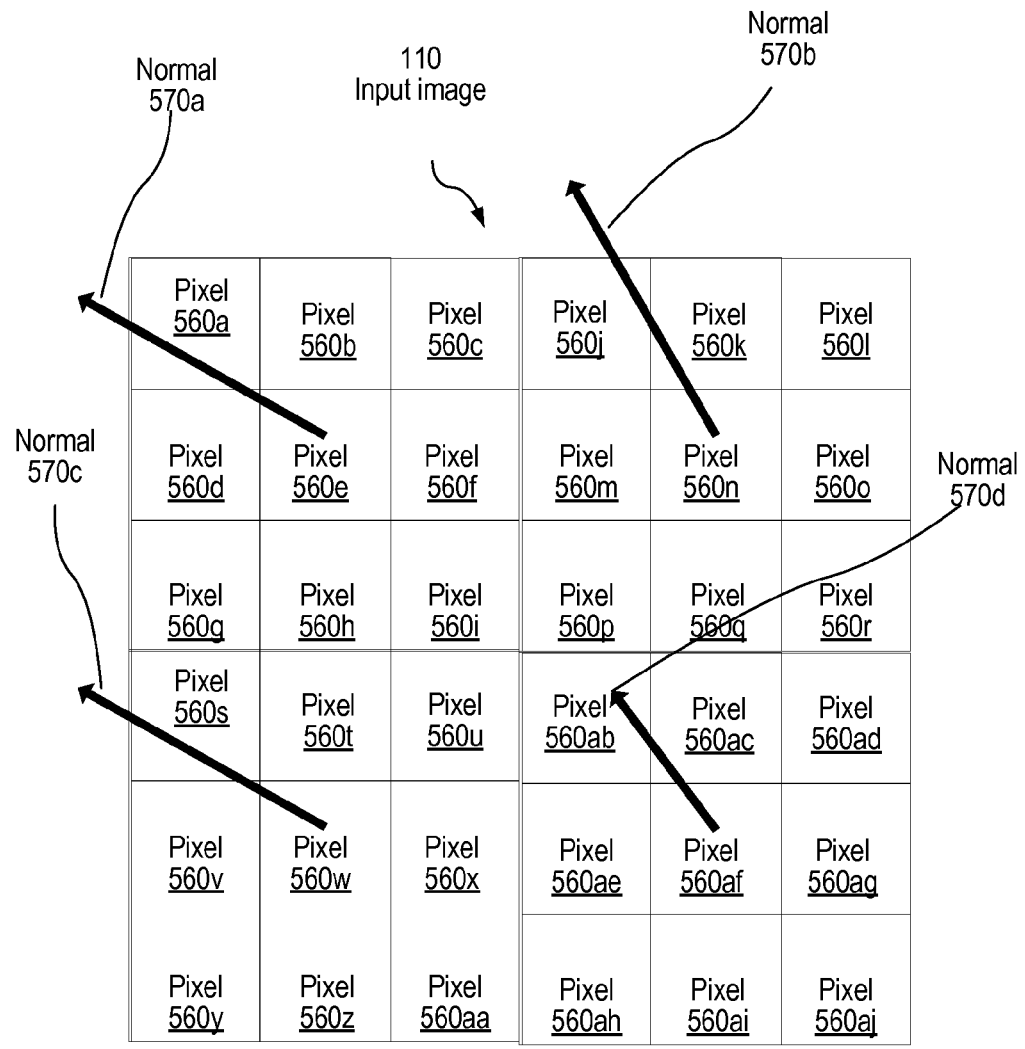
FIG. 5C illustrates surface normal vectors at multiple subregion locations, each subregion comprising multiple pixels, according to some embodiments.

FIG. 5C illustrates surface normal vectors at multiple subregion locations, each subregion comprising multiple pixels, according to some embodiments. For each of several subregions (not labeled) of input image 110, one of several subregion normal vectors 570*a*-570*n* exists. The size and configuration of pixel groups used as subregions will vary between embodiments, and subregions may overlap. For instance, in one embodiment, a subregion associated with normal 570*a* may include pixels 560*a*-560*i*. In such an embodiment, a subregion associated with normal 570*b* may include pixels 560*j*-560*r*. A subregion associated with normal 570*c* may include pixels 560*s*-560*aa*, and a subregion associated with normal 570*d* may include pixels 560*ab*-560*aj*. In an embodiment that accommodates overlapping subregions, a subregion associated with normal 570*a* may include pixels 560*a*-560*i* as well as pixels 560*j*, 560*m*, 560*p*, 560*ab*, and 560*s*-*u*. In such an embodiment, a subregion associated with normal 570*b* may include pixels 560*j*-560*r* as well as pixels 560*c*, 560*f*, 560*i*, 560*u*, and 560*ab*-*ad*. A subregion associated with normal 570*c* may include pixels 560*s*-560*aa* as well as pixels 560*ab*, 560*ae*, 560*ah*, 560*p*, and 560*g*-*i*, and a subregion associated with normal 570*d* may include pixels 560*ab*-560*aj* as well as pixels 560*u*, 560*i*, 560*aa*, 560*i*, and 560*p*-*r*. In some embodiments, a patch-based shape from shading method is performed as described above with respect to patch-based shape from shading module 160 and further described below with respect to FIGS. 7A-9.

Light-Space Model Operations

Figure 6A:
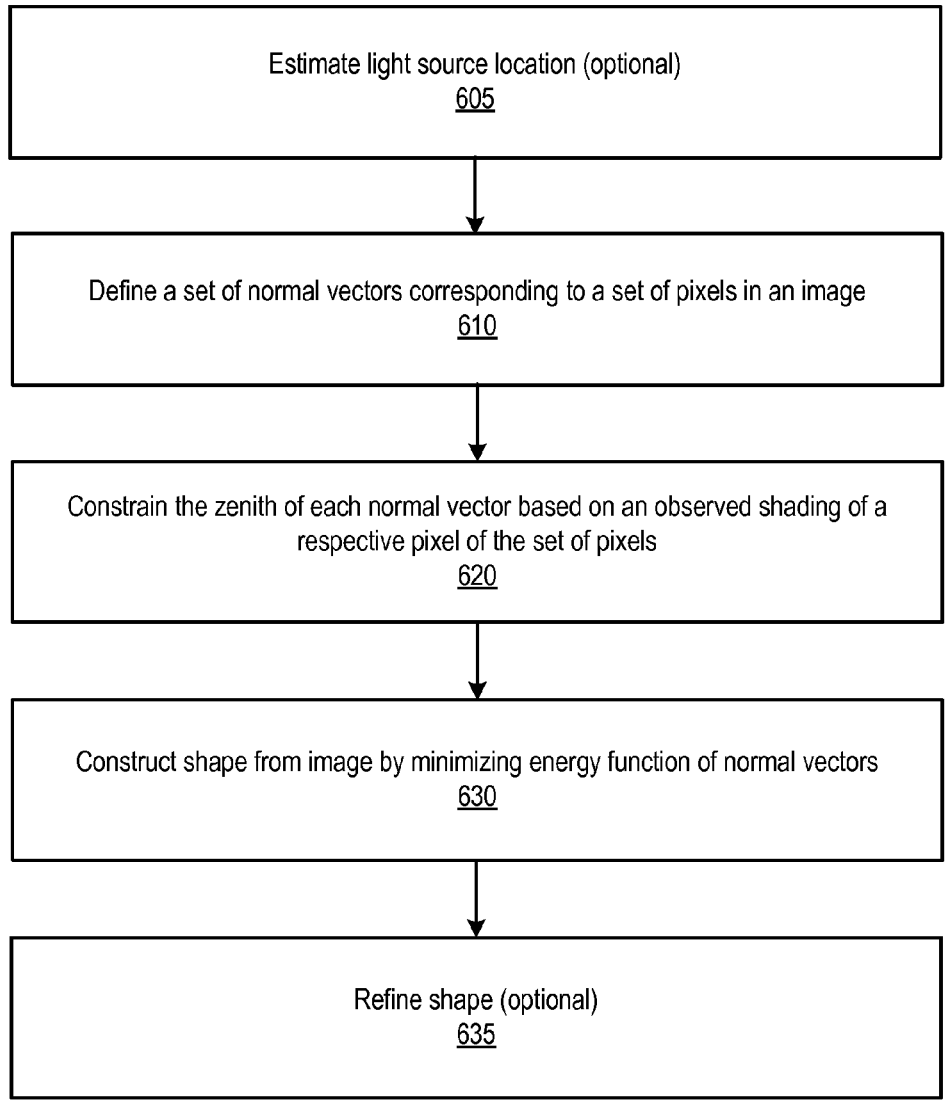
FIG. 6A depicts operations that may be performed in the context of light-space methods to derive shape from shading of images according to some embodiments.

FIG. 6A depicts operations that may be performed in the context of light-space methods to derive shape from shading of images according to some embodiments. With respect to FIG. 6A, and more generally with respect to FIGS. 6A-9, while the operations shown various blocks are given a sequential appearance and explanation for the sake of clarity, one of skill in the art will readily understand in light of having read the present disclosure that the sequential presentation is not intended to imply sequential execution in actual embodiments. More specifically, embodiments may perform steps of some flowcharts in order other than the order of presentation and may omit some steps or add other steps without departing from the scope and intent of the present disclosure.

A light source location for an image is estimated (optional) (block 605). A set of normal vectors corresponding to a set of pixels in the image is defined (block 610). One of skill in the art will readily understand, in light of having read the present disclosure, that while the vectors are defined, in some embodiments, at block 610, their values are defined subsequently. A zenith of each normal vector is constrained based on an observed shading of a respective pixel of the set of pixels (block 620). A shape is constructed from the image by minimizing an energy function of the normal vectors (block 630). Refinements to the shape are performed (optional) (block 635) as described above.

Figure 6B:
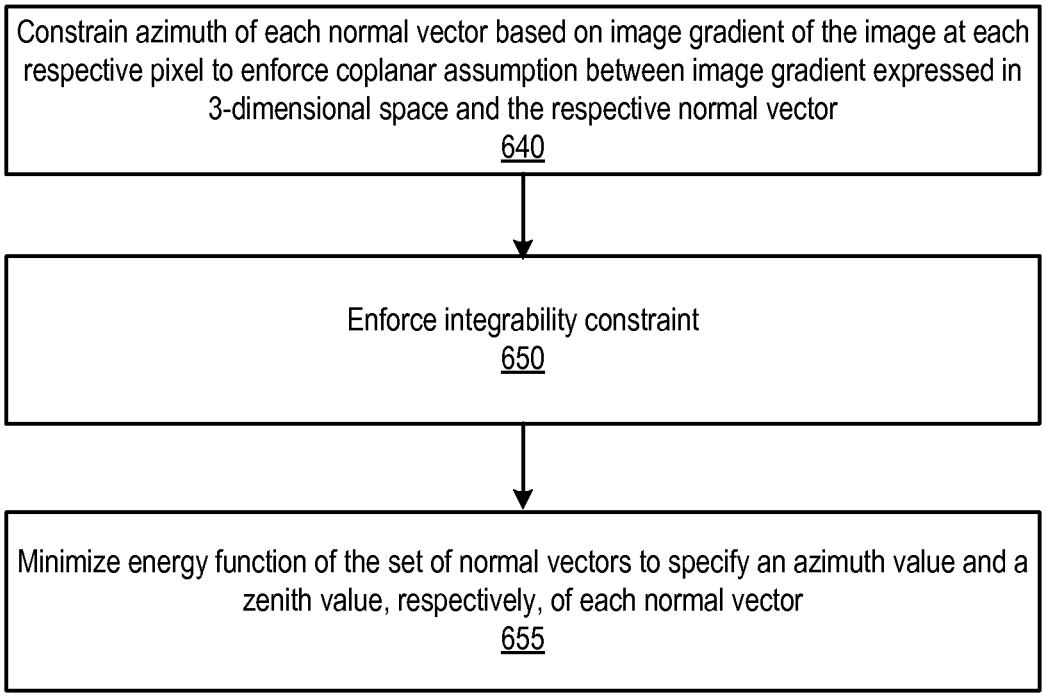
FIG. 6B illustrates additional operations that may be performed in the context of light-space methods to derive shape from shading of images according to some embodiments.

FIG. 6B illustrates additional operations that may be performed in the context of light-space methods to derive shape from shading of images according to some embodiments. The azimuth of each normal vector is constrained based on an image gradient of the image at each respective pixel to enforce a coplanar assumption between the image gradient expressed in three-dimensional space and the respective normal vector (block 640). An integrability constraint is enforced (block 650). An energy function of the set of normal vectors is minimized to specify an azimuth value and a zenith value, respectively, of each normal vector (block 655).

Figure 6C:
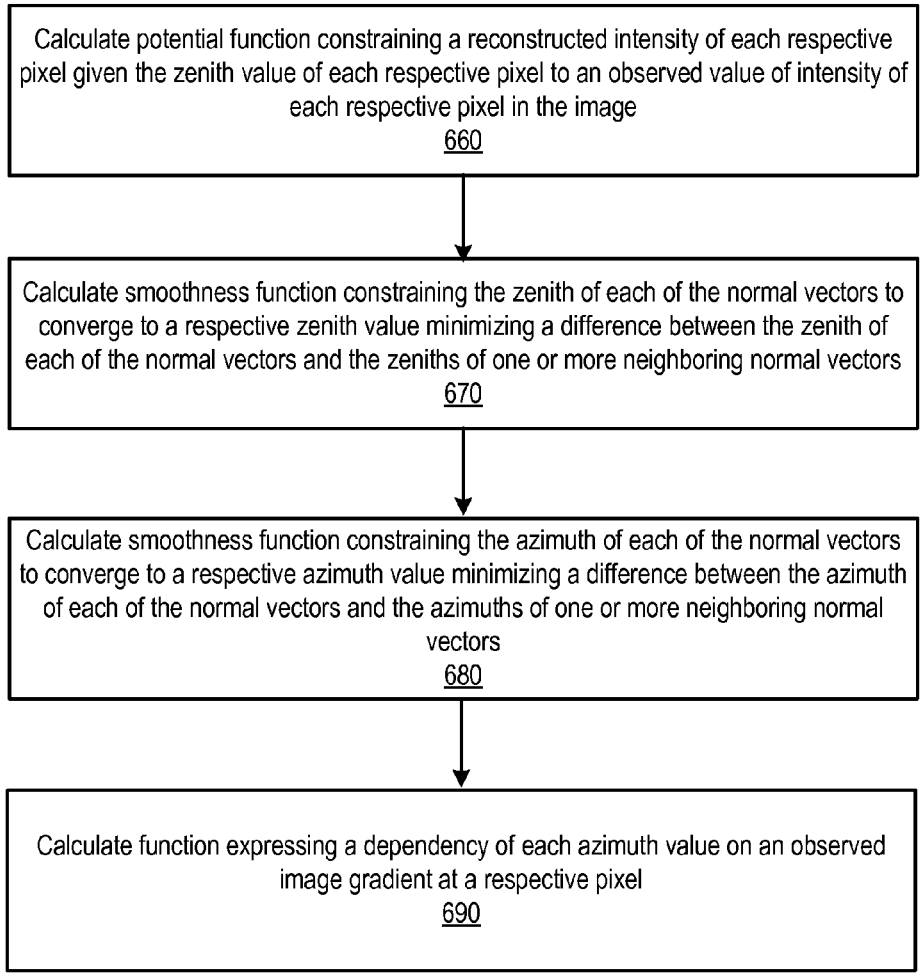
FIG. 6C depicts operations that may be performed to support calculations useful in light-space methods to derive shape from shading of images according to some embodiments.

FIG. 6C depicts operations that may be performed to support calculations useful in light-space methods to derive shape from shading of images according to some embodiments. A potential function constraining a reconstructed intensity of each respective pixel given the zenith value of each respective pixel to an observed value of intensity of each respective pixel in the image is calculated (block 660). A smoothness function constraining the zenith of each of the normal vectors to converge to a respective zenith value minimizing a difference between the zenith of each of the normal vectors and the zeniths of one or more neighboring normal vectors is calculated (block 670). A smoothness function constraining the azimuth of each of the normal vectors to converge to a respective azimuth value minimizing a difference between the azimuth of each of the normal vectors and the azimuths of one or more neighboring normal vectors is calculated (block 680). A function expressing a dependency of each azimuth value on an observed image gradient at a respective pixel is calculated (block 690).

Patch-Based Model Operations

Figure 7A:
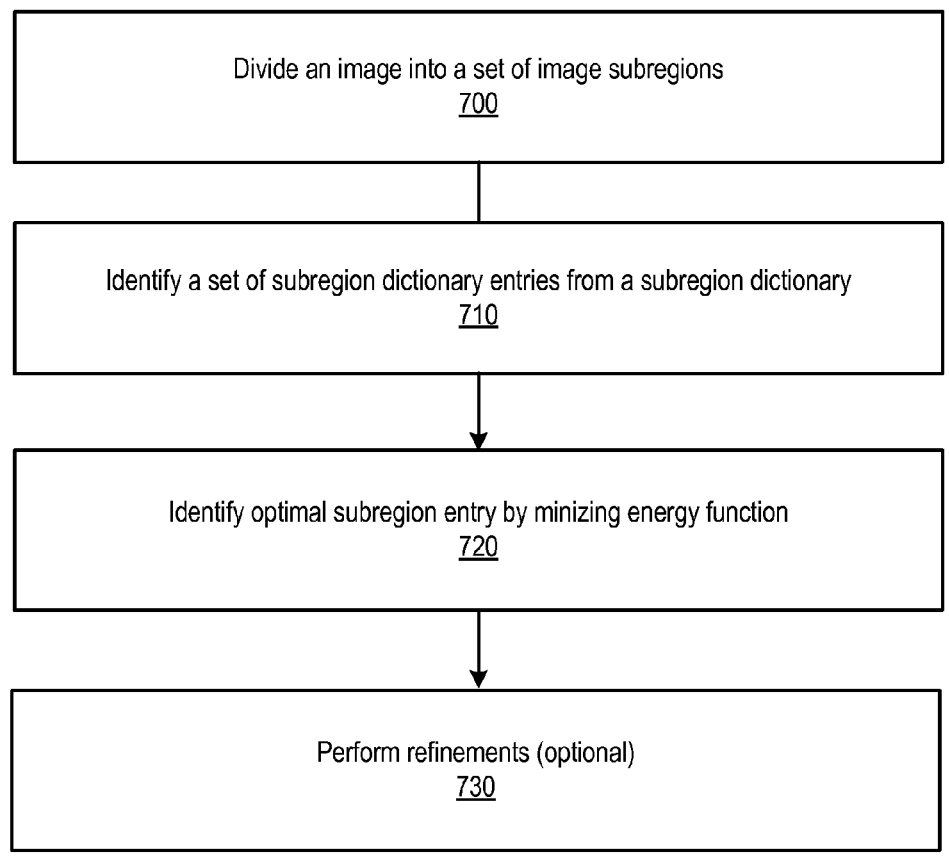
FIG. 7A illustrates operations that may be performed in the context of patch-based methods to derive shape from shading of images according to some embodiments.

FIG. 7A illustrates operations that may be performed in the context of patch-based methods to derive shape from shading of images according to some embodiments. An image is divided into a set of image subregions (block 700). A set of subregion dictionary entries matching an appearance of each subregion is identified from a subregion dictionary (block 710). Optimal subregion dictionary entries for each subregion are identified by minimizing an energy function of the normal vectors of the optimal subregion dictionary entries (block 720). Refinements are performed (optional) as described above (block 730).

Figure 7B:
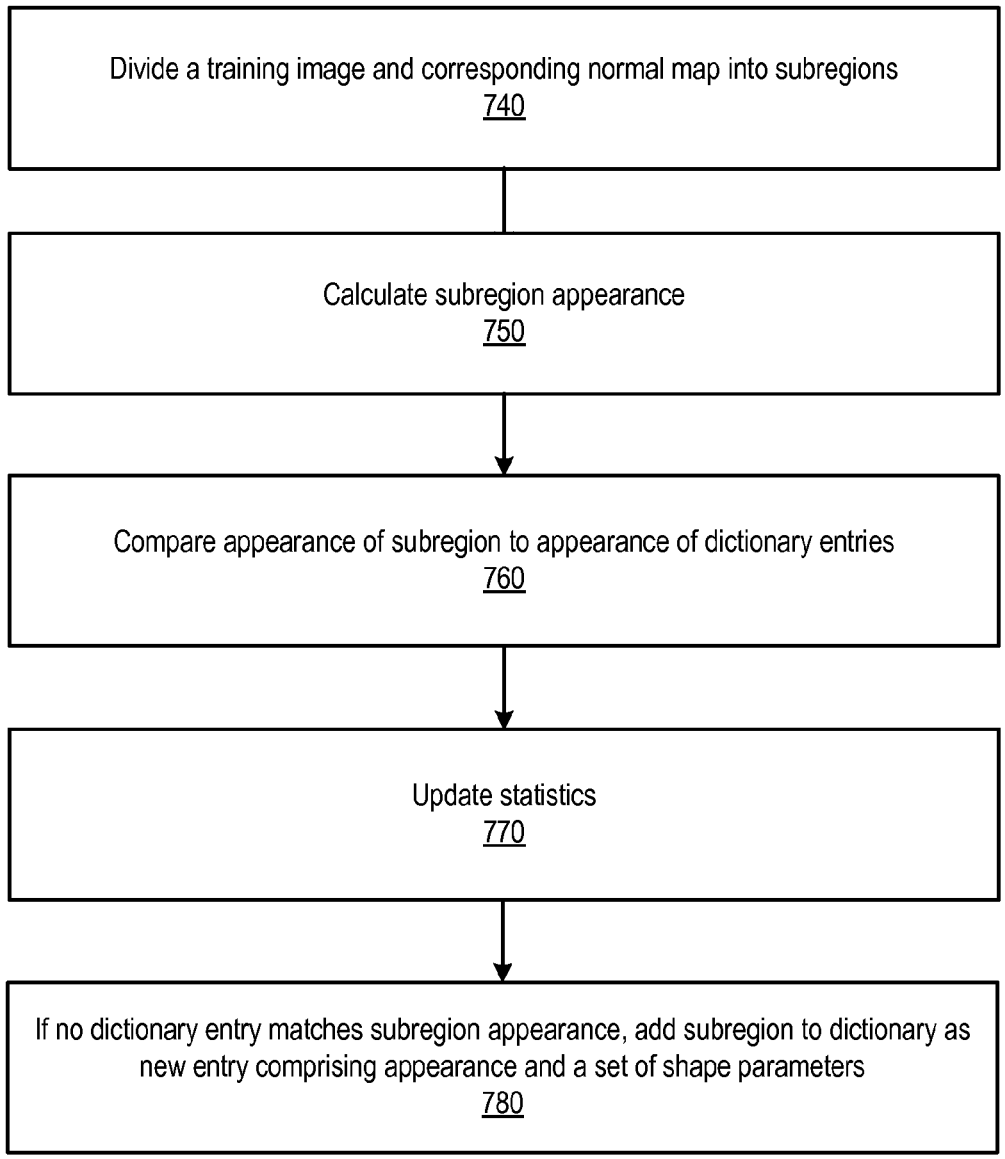
FIG. 7B depicts operations that may be performed in the context of machine-learning methods for developing a subregion dictionary that may be used to implement machine learning techniques in the context of patch-based methods to derive shape from shading of images according to some embodiments.

FIG. 7B depicts operations that may be performed in the context of machine-learning methods for developing a subregion dictionary that may be used to implement machine learning techniques in the context of patch-based methods to derive shape from shading of images according to some embodiments. A training image and a corresponding normal map are divided into subregions (block 740). For a given subregion, a subregion appearance is calculated (block 750). The subregion appearance is compared to subregion appearances for dictionary entries (block 760). Statistics reflecting whether the subregion appearance matched a subregion appearance of an existing dictionary entry are updated (block 770). If no dictionary entry matches a subregion appearance, a subregion is added to a subregion dictionary as a new entry comprising a subregion appearance and a set of shape parameters, which may include geometry, a set of normal vectors (block 780).

Figure 8:
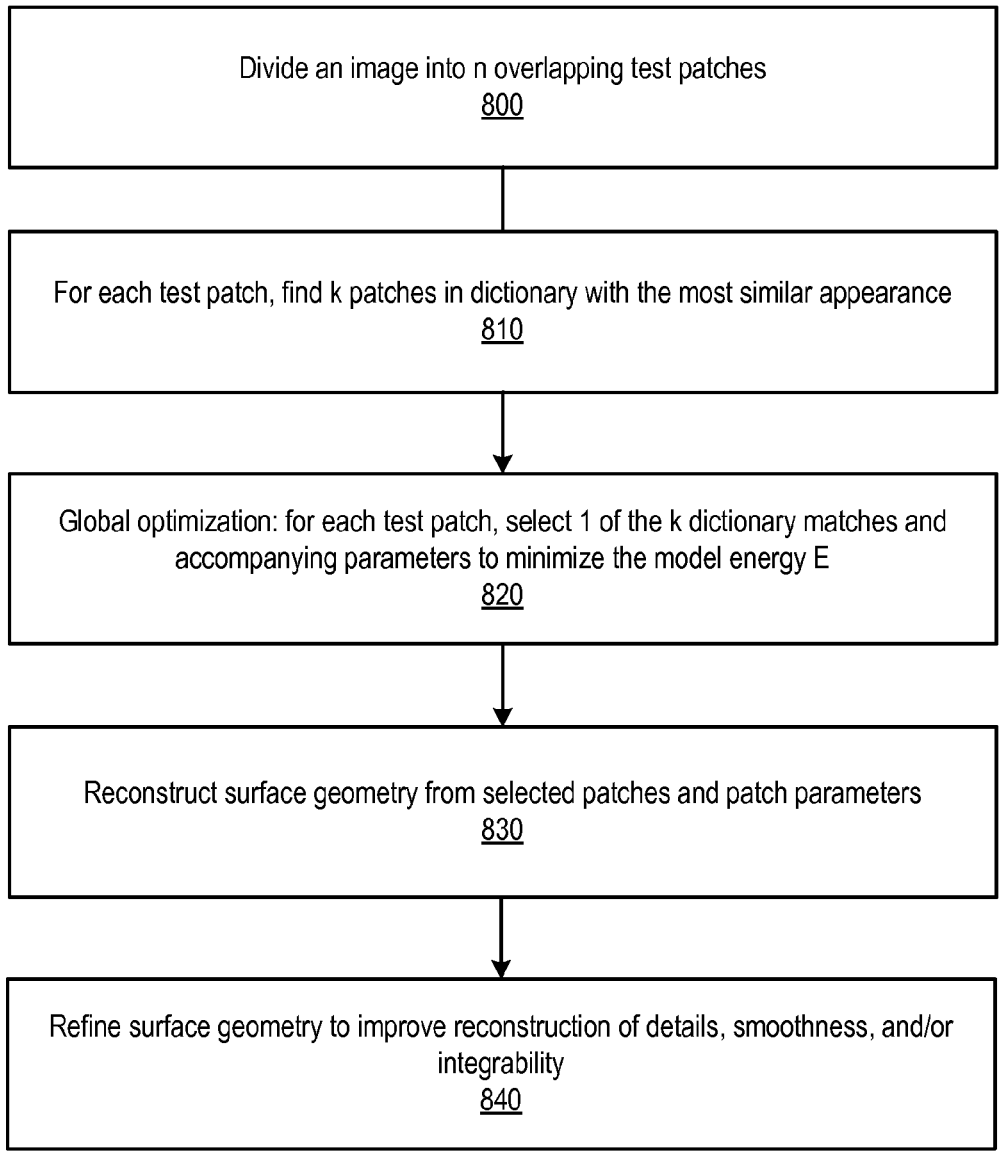
FIG. 8 illustrates additional operations that may be performed in the context of patch-based methods to derive shape from shading of images according to some embodiments.

FIG. 8 illustrates additional operations that may be performed in the context of patch-based methods to derive shape from shading of images according to some embodiments. An image is divided into n overlapping test patches (block 800). For each test patch, k patches in a dictionary with the most similar appearance are found (block 810). A global optimization is performed. For each test patch, one of the k dictionary matches and accompanying parameters are found to minimize the model energy E (block 820). A surface geometry is reconstructed from selected patches and patch parameters (block 830). The surface geometry is refined to improve reconstruction of details, smoothness, and/or integrability (block 840).

Figure 9:
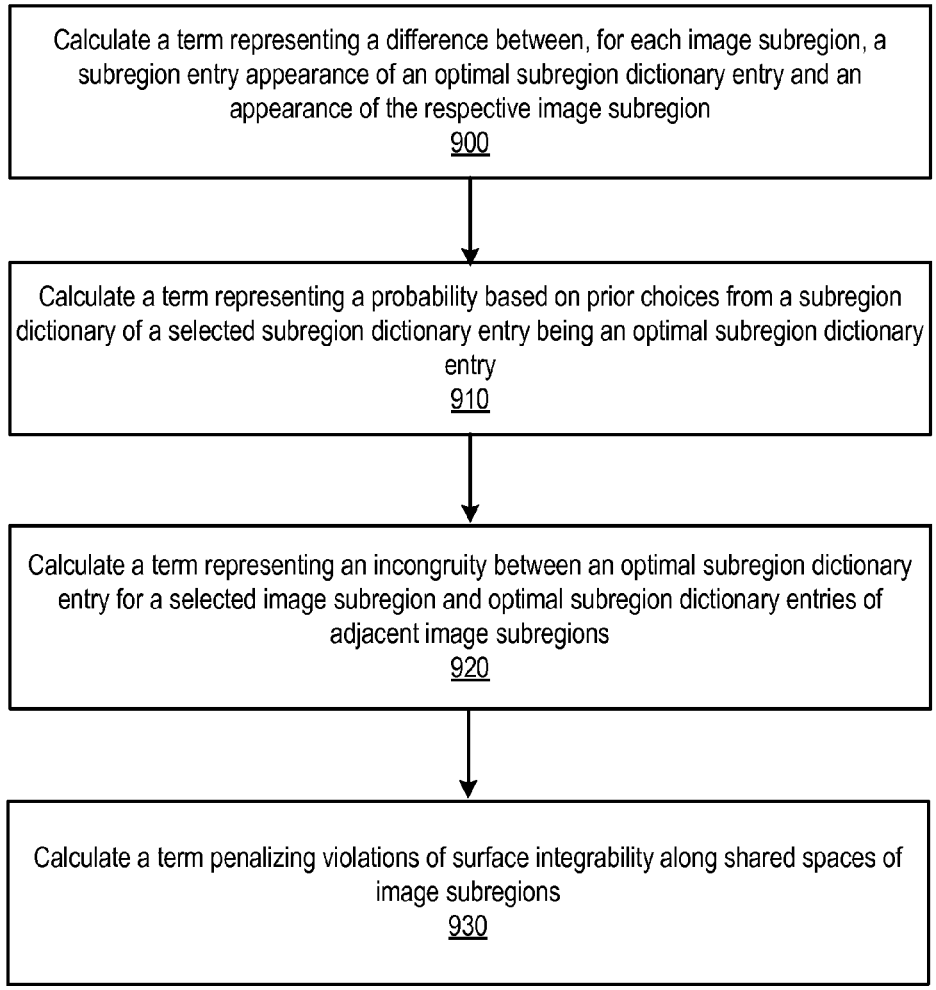
FIG. 9 depicts operations that may be performed to support calculations useful in patch-based methods to derive shape from shading of images according to some embodiments.
Figure 10:
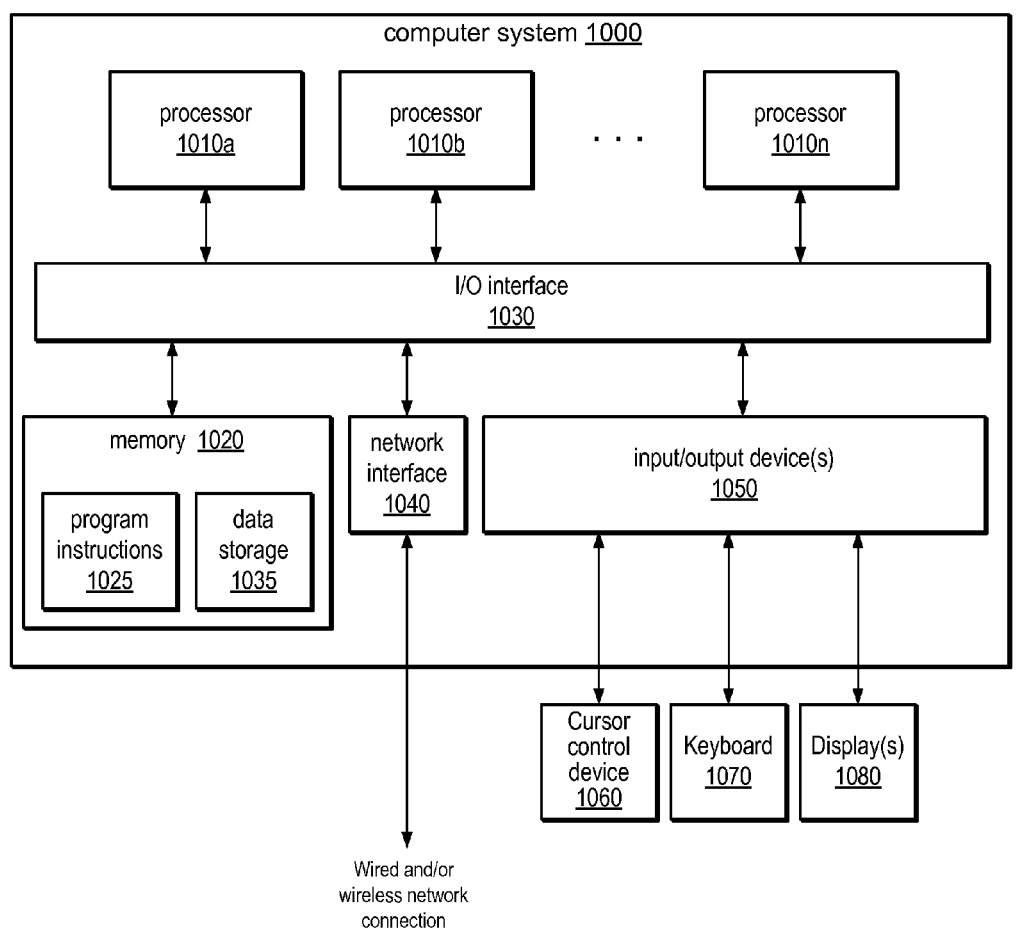
FIG. 10 illustrates an example computer system that may be used in embodiments.

FIG. 9 depicts operations that may be performed to support calculations useful in patch-based methods to derive shape from shading of images according to some embodiments. A term representing a difference between, for each image subregion, a subregion entry appearance of an optimal subregion dictionary entry and an appearance of the respective image subregion is calculated (block 900). A term representing a probability based on prior choices from a subregion dictionary of a selected subregion dictionary entry being an optimal subregion dictionary is calculated (block 910). A term representing an incongruity between an optimal subregion dictionary entry for a selected image subregion and optimal subregion dictionary entries of adjacent image subregions is calculated (block 920). A term penalizing violations of surface integrability along shared spaces of image subregions is calculated (block 930).

Example System

Embodiments of a shape from shading module and/or the various shape from shading techniques as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a shape from shading module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a shape from shading module as described herein, and data storage 1035, comprising various data accessible by program instructions 1025. In one embodiment, program instructions 1025 may include software elements of embodiments of a shape from shading module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a shape from shading module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, interne appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising,
dividing an image into a set of image subregions;
for each image subregion of the set of image subregions,
identifying a set of subregion dictionary entries from a subregion dictionary, each respective subregion dictionary entry comprising:
a subregion entry appearance matching an appearance of the respective image subregion; and
a subregion entry geometry comprising a shape construction parameter; and
constructing a shape from the image by at least identifying a set of optimal subregion dictionary entries and minimizing an energy function of the sets of subregion dictionary entries for the set of image subregions, said minimizing including calculating a term representing an incongruity between an optimal subregion dictionary entry for a selected image subregion and optimal subregion dictionary entries of adjacent image subregions, the incongruity being determined by a sum of a square difference between normals of overlapped subregions, each optimal subregion dictionary entry comprising a subregion entry associated with a minimum of the energy function of a respective one of the image subregions, the shape comprising a shape construction parameter from a subregion geometry entry of each optimal subregion geometry entry of the set of optimal subregion geometry entries.

2. The computer-implemented method of claim 1, wherein the minimizing the energy function of the sets of subregion dictionary entries for the set of image subregions further comprises calculating a term representing a difference between a subregion entry appearance of an optimal subregion dictionary entry and an appearance of the respective image subregion.

3. The computer-implemented method of claim 1, wherein the minimizing the energy function of the sets of subregion dictionary entries for the set of image subregions further comprises calculating a term representing a probability based on prior choices from a subregion dictionary of a selected subregion dictionary entry being an optimal subregion dictionary entry.

4. The computer-implemented method of claim 1, wherein the minimizing the energy function of the sets of subregion dictionary entries for the set of image subregions further comprises calculating a term penalizing violations of surface integrability along shared spaces of image subregions.

5. The computer-implemented method of claim 1, further comprising:
generating the subregion dictionary by at least:
dividing a training image and a corresponding normal map into training subregions;
comparing an appearance of a training subregion to entries of the subregion dictionary; and
in response to failure to find an entry of the subregion dictionary with an appearance matching an appearance of the training subregion, creating a new entry of the subregion dictionary comprising the appearance of the training subregion and a shape construction parameter of the training subregion.

6. The computer-implemented method of claim 1, wherein the shape construction parameter is a normal vector.

7. A system, comprising:
at least one processor; and
a memory comprising program instructions that are executable by the at least one processor to:

divide an image into a set of image subregions;
for each image subregion of the set of image subregions, identify a set of subregion dictionary entries from a subregion dictionary, each subregion dictionary entry comprising:
a subregion entry appearance matching an appearance of the respective image subregion; and
a subregion entry geometry comprising a shape construction parameter; and
construct a shape from the image by at least identifying a set of optimal subregion dictionary entries and minimizing an energy function of the sets of subregion dictionary entries for the set of image subregions, the energy function being minimized by at least calculating a term that represents an incongruity between an optimal subregion dictionary entry for a selected image subregion and optimal subregion dictionary entries of adjacent image subregions, the incongruity determined by a sum of a square difference between normals of overlapped subregions, each optimal subregion dictionary entry comprising a subregion entry associated with a minimum of the energy function of a respective one of the image subregions, the shape comprising a shape construction parameter from a subregion geometry entry of each optimal subregion geometry entry of the set of optimal subregion geometry entries.

8. The system of claim 7, wherein said minimizing the energy function further comprises calculation of a term representing a difference between a subregion entry appearance of an optimal subregion dictionary entry and an appearance of the respective image subregion.

9. The system of claim 7, wherein said minimizing the energy function further comprises calculation of a term representing a probability based on prior choices from a subregion dictionary of a selected subregion dictionary entry being an optimal subregion dictionary entry.

10. The system of claim 7, wherein the term that represents the incongruity is usable to enforce compatibility between matching subregion dictionary entries for overlapping image subregions.

11. The system of claim 7, wherein said minimizing the energy function further comprises calculation of a term penalizing violations of surface integrability along shared spaces of image subregions.

12. The system of claim 7, further comprising program instructions executable by the at least one processor to:
generate the subregion dictionary based on:
division of a training image and a corresponding normal map into training subregions,
comparison of an appearance of a training subregion to entries of the subregion dictionary, and
creation of a new entry of the subregion dictionary comprising the appearance of the test subregion and a shape construction parameter of the training subregion, the creation of the new entry being responsive to a failure to find an entry of the subregion dictionary with an appearance matching an appearance of the training subregion.

13. The system of claim 7, wherein the shape construction parameter is a normal vector.

14. A computer-readable memory device storing program instructions that are computer-executable to perform operations comprising:

dividing an image into a set of image subregions;
for each image subregion of the set of image subregions, identifying a set of subregion dictionary entries from a subregion dictionary, each respective subregion dictionary entry comprising:
a subregion entry appearance matching an appearance of the respective image subregion; and
a subregion entry geometry comprising a shape construction parameter; and
constructing a shape from the image by at least identifying a set of optimal subregion dictionary entries and minimizing an energy function of the sets of subregion dictionary entries for the set of image subregions, said minimizing including calculating a term representing an incongruity between an optimal subregion dictionary entry for a selected image subregion and optimal subregion dictionary entries of adjacent image subregions, the incongruity determined by a sum of a square difference between normals of overlapped subregions, each optimal subregion dictionary entry comprising a subregion entry associated with a minimum of the energy function of a respective one of the image subregions, the shape comprising a shape construction parameter from a subregion geometry entry of each optimal subregion geometry entry of the set of optimal subregion geometry entries.

15. The computer-readable memory device of claim 14, wherein said minimizing the energy function further comprises calculating a term representing a difference between a subregion entry appearance of an optimal subregion dictionary entry and an appearance of the respective image subregion.

16. The computer-readable memory device of claim 14, wherein said minimizing the energy function further comprises calculating a term representing a probability based on prior choices from a subregion dictionary of a selected subregion dictionary entry being an optimal subregion dictionary entry.

17. The computer-readable memory device of claim 16, wherein the probability is calculated by fitting a Gaussian mixture model to observed values for each of the prior choices from the subregion dictionary.

18. The computer-readable memory device of claim 14, wherein the term that represents the incongruity is usable to enforce compatibility between matching subregion dictionary entries for overlapping image subregions.

19. The computer-readable memory device of claim 14, wherein said minimizing the energy function further comprises calculating a term penalizing violations of surface integrability along shared spaces of image subregions.

20. The computer-readable memory device of claim 14, wherein the operations further comprise:
generating the subregion dictionary by at least:
dividing a test image and a corresponding normal map into test subregions;
comparing an appearance of a test subregion to entries of the subregion dictionary; and
in response to failure to find an entry of the subregion dictionary with an appearance matching an appearance of the test subregion, creating a new entry of the subregion dictionary comprising the appearance of the test subregion and a shape construction parameter of the test subregion.

* * * * *